United States Patent [19]

Dybro et al.

[11] Patent Number: 5,697,571
[45] Date of Patent: Dec. 16, 1997

[54] CHAIN LINK RACK PRETENSIONER

[75] Inventors: Niels Dybro, Utica; Jason Raines, Harrison Township, both of Mich.

[73] Assignee: AlliedSignal Inc., Morristown, N.J.

[21] Appl. No.: 650,746

[22] Filed: May 17, 1996

[51] Int. Cl.⁶ ............................................. B60R 22/46
[52] U.S. Cl. ................... 242/374; 474/91; 474/147; 474/242
[58] Field of Search ................ 242/374; 280/806; 297/478, 480; 474/242, 245, 146, 147, 91

[56] References Cited

U.S. PATENT DOCUMENTS

| | | | |
|---|---|---|---|
| 4,158,402 | 6/1979 | Romans | 474/147 |
| 4,444,010 | 4/1984 | Bendler | 242/374 |
| 4,508,287 | 4/1985 | Nilsson | 242/374 |
| 4,685,898 | 8/1987 | Wiens | 474/242 |
| 4,692,130 | 9/1987 | Novak | 474/242 |
| 5,246,406 | 9/1993 | Vahabzadeh | 474/242 |
| 5,334,111 | 8/1994 | Cole et al. | 474/245 |
| 5,443,222 | 8/1995 | Modinger et al. | 242/374 |

FOREIGN PATENT DOCUMENTS 3220498  12/1983  Germany ............ 242/374

*Primary Examiner*—John M. Jillions
*Attorney, Agent, or Firm*—Markell Seitzman

[57] ABSTRACT

An apparatus (20, 100) comprising: a driven gear (102) operatively linked to a spool of a retractor (20) to rotate the spool (24) in a direction of retraction to cause a seat belt (31) wound thereabout to retract; an arcuate tube (108) having a flat exit end (110) proximate the gear; a flexible chain link rack (130), movable within the tube, having a front end (134a) initially maintained out of engagement with the first driven means and pushed into engagement with the first driven means to cause same to rotate; a piston (140) for pushing the rack (130) into engagement with the gear thereby causing the gear to rotate and catching mechanism for retaining the rack after it has exited the exit end of the tube.

21 Claims, 5 Drawing Sheets

CHAIN LINK RACK PRETENSIONER

BACKGROUND AND SUMMARY OF THE INVENTION

The present invention generally relates to safety restraint devices for protecting vehicle occupants and more particularly to a pretensioning or belt tightening device used with a retractor and also an improved chain link rack used to rotate the retractor's spool.

Pretensioners or belt tighteners, as they are also called, operate in conjunction with seat belt retractors or are attached to one end of the belt that is connected to a seat belt buckle. The packaging of retractor pretensioners has created challenges for the suppliers of retractors and pretensioners as well as for the car designers and makers. Present pretensioners utilize a straight tube for harnessing the gas pressure from a pyrotechnic gas generator which acts on a piston which is propelled down the tube. The piston is connected to a Bowden cable, with its other end wrapped around a pulley or clutch. As the cable is pulled by the piston, the pulley rotates or the clutch is activated to reverse wind the web storage spool pretensioning (tightening) the seat belt. The straight tube protrudes significantly away from the retractor and requires extra space to be packaged within the car's trim panels, or requires extra large holes at the mounting location for the seat belt retractor.

It is an object of the present invention to provide a simple, compact and reliable pretensioner that can be used with a seat belt retractor or where applicable a seat belt buckle.

The present invention provides a compact pretensioner that can be located on a side of the retractor and one that can be packaged within the side profile of the retractor. This feature will allow the pretensioner and retractor to be packaged in a space only slightly larger than the space required for a standard retractor. The pretensioner is fitted with an electrically triggered pyrotechnic gas generator, which, when ignited in case of an accident, produces gas. The gas applies pressure on a piston that is connected to the back end of a chain link rack (CLR) described below. As the gas pressure builds up, the piston and the chain link rack (CLR) move across and rotate a gear. The gear is connected to the web storage spool of the retractor. As the gear and spool are forcibly rotated, the seat belt is retracted onto the spool.

The pretensioner utilizes a unique transport device which is the chain link rack (CLR). The chain link rack can be used in any application that otherwise would use a standard rack and pinion transmission. A benefit of using the chain link rack is that it can be packaged compactly in situations where the strength of a traditional rack is needed but where room is not available to satisfy the displacement needs of a traditional rack. When laid flat the CLR has the profile of a regular spur gear rack to efficiently drive the gear and is pliable such as a roller or HV (high velocity) chain to enable the CLR to operate within a small package. A similar package using roller or HV (high velocity) chain would be wider for the same force transfer requirement due to their link designs.

The CLR is comprised of a plurality of links formed by adjacent plates. In the preferred embodiment of the invention the full width of the chain link rack is available to transfer force to the teeth of the gear (and vice versa), which makes it possible to minimize the width of the rack and overall package to the requirements for force transfer. This is in contrast with an HV chain (which also uses a plurality of plates per link) where only every other plate is in contact with the same gear tooth.

Accordingly the invention comprises: a pretensioner having: driven means, such as a spur gear, operatively linked to a spool of a retractor to rotate the spool in a direction of belt retraction to cause a seat belt wound thereabout to retract. The pretensioner includes an arcuate tube having a flat exit end proximate the driven means; and a flexible drive means movable within the tube, having a front end initially maintained out of engagement with the driven means and pushed into engagement with the driven means to cause same to rotate. The pretensioner further includes means for pushing the first drive means into engagement with the first driven means thereby causing the first driven means to rotate. Catching means are provided to retain a portion of the drive means after it has exited the exit end of the tube.

Many other objects and purposes of the invention will be clear from the following detailed description of the drawings.

DETAILED DESCRIPTION OF THE DRAWINGS

Figure 1:
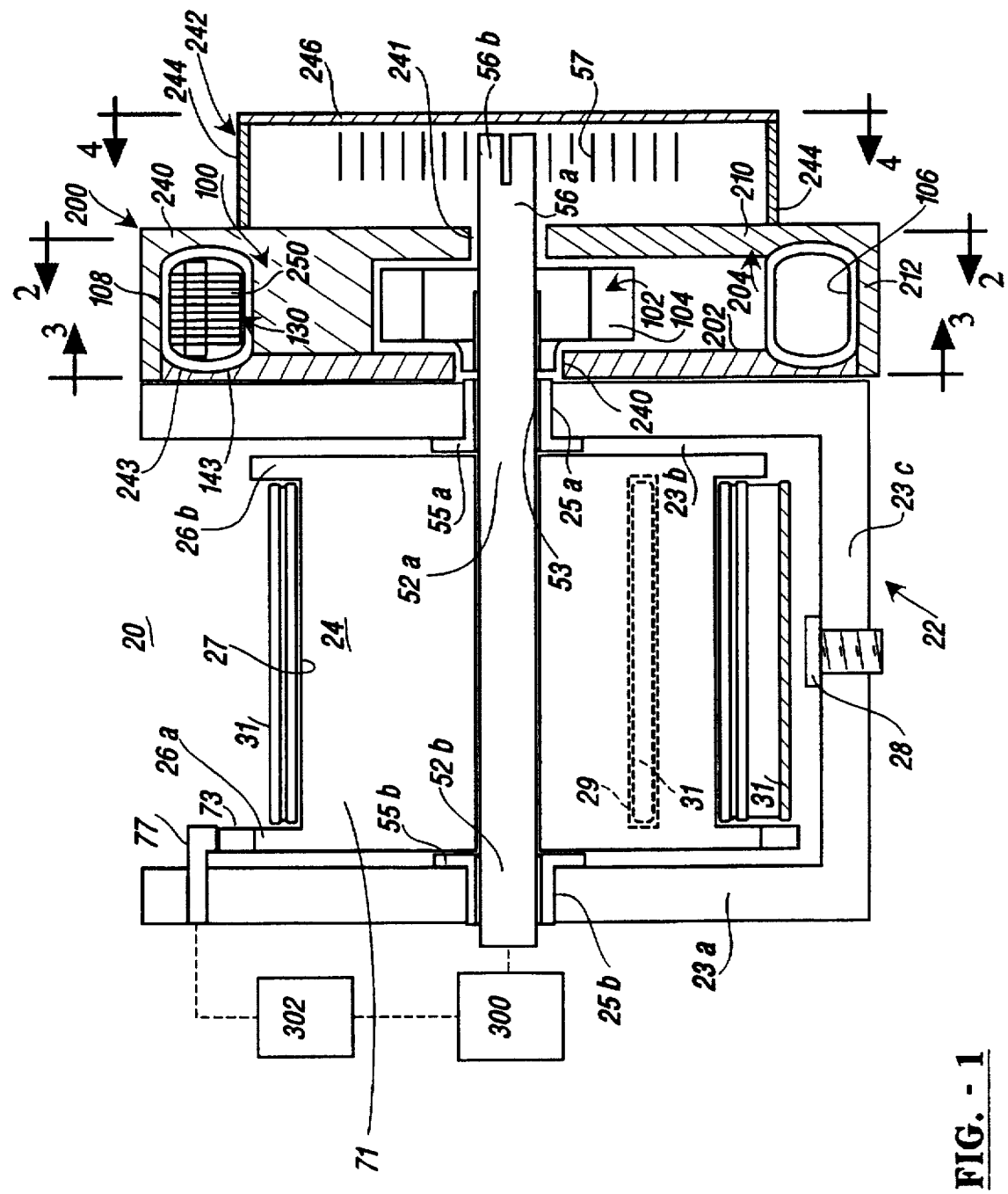
FIG. 1 illustrates a cross-sectional view of a seat belt retractor and pretensioner.

Reference is made to FIG. 1 which illustrates a typical retractor 20 operating in concert with a pretensioner 100. The retractor 20 comprises a U-shaped frame 22 adapted to be connected to a part of a vehicle body or to an occupant seat. The frame includes frame sides 23a,b having respective openings 25a and 25b and a rear or connecting part 23c typically having an opening for receipt of a fastening bolt 28. The retractor additionally includes a spool or reel 24 rotatably mounted to the frame 22. The spool has a center part or body 27 about which seat belt webbing 31 is wound (a few layers of webbing are shown in dotted line) and optional flanges 26a and 26b. The center part 27 includes a slot 29 into which the inner end of the seat belt 31 is inserted and held in a known manner.

The spool includes a shaft assembly 50 having a right hand section 52a with a circular, wall profile 53 which is supported relative to bushing 55a. The section 52a includes a shaft extension 56a having a forked end 56b that forms a spring arbor and is adapted to receive a rewind spring 57, of known construction, to retract the extended seat belt. Integrally formed or seated on the shaft extension 56a is a gear 102, having a plurality of involute shaped teeth 104 which is part of the pretensioner 100. The left hand section 52b of the axle assembly is supported relative to the frame 22 by a bearing 55b. The shaft or spool includes a lock wheel 71 that may be integrally formed thereon or pressed thereto having lock teeth 73 which are engaged by a rotatably mounted, locking pawl 77 in a known manner.

The retractor additionally includes a web sensor 300 and a vehicle sensor 302 which are diagrammatically illustrated.

The lock wheel 71, is locked in response to information derived from the vehicle sensor and a web sensor. These sensors respectively sense an excessive rate of increase of seat belt protraction from the retractor 20 and excessive vehicle deceleration. As is known in the art the web sensor may be nestled within a lock cup (not shown) which is received adjacent a ratchet wheel. The vehicle sensor is carried by the lock cup and includes a sensor pawl that engages ratchet teeth. Movement of the lock cup moves the lock pawl 77 into engagement with the lock teeth 73. European Patent Document EP 0 228 729 A1 is illustrative of a retractor having a web sensor, vehicle sensor, and lock cup to move the lock pawl 77 into engagement with the lock wheel. This document is incorporated herein by reference.

As mentioned, the pretensioner 100 includes the driven gear 102 with involute shaped teeth 104. The sides 105 of each gear tooth are generally curved to engage a flat side 164 of the teeth 156 of a chain link rack (CLR) 130. The pretensioner includes an arcuately shaped tube or tubular housing 108 secured within a tube housing 200 that is fixed to the adjacent retractor frame side. The tube 108 defines a passage 106 and lies generally within a plane. As can be seen from FIGS. 1 and 7 the cross-section of the passage 106 is generally oval shaped having two opposing flat guide walls 114a and b and opposing, curved guide walls 114c and d. The tube 108 includes a first open end 110 with an enlarged opening 112 within the tube wall 114a, 114c and 114d. The teeth 104 of gear 102 extend into the opening 112 and into the passage 106 and are engaged by the CLR 130. The lower surface of the tube 114b proximate end 110 and opening 112 is flat to permit the chain link rack 130 to lay flat as it engages the gear teeth 104. Typically, the length of this flat portion is about two or three chain links. The end 110 of the tube is angled relative to the teeth by about one-half of the angle between adjacent teeth 104, i.e. the pressure angle, P. In a more general sense the engagement angle at which the CLR 130 engages the gear teeth 104 measured relative to the seat belt pull-off direction is chosen to minimize retractor bearing load during operation of the pretensioner. In the illustrated embodiment the pull-off direction of the seat belt is generally horizontal. If this engagement angle is equal to the pressure angle the bearing load will be minimized. A departure from this angle of +/−10° will provide adequate bearing protection.

Figure 8:
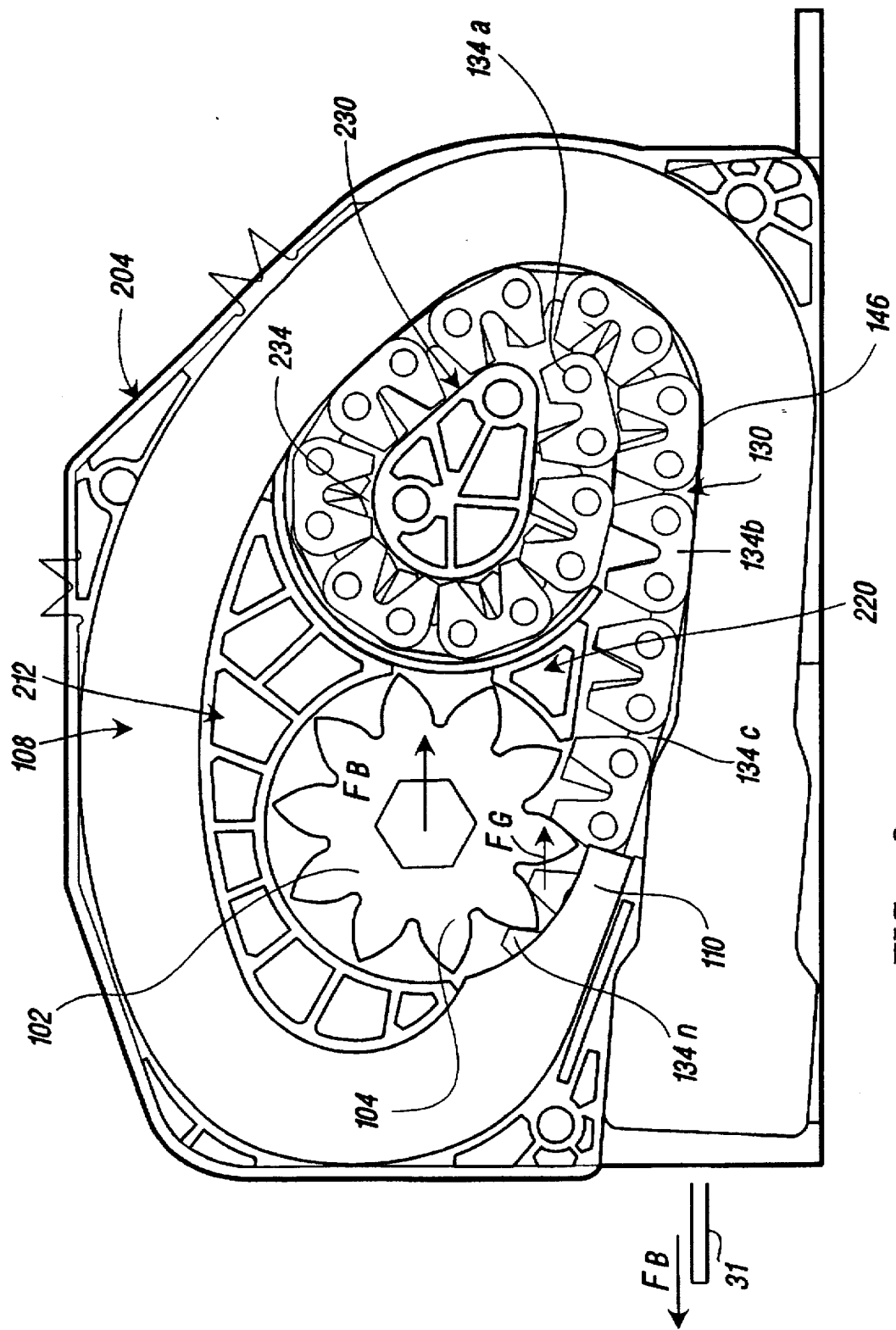
FIG. 8 is another cross-sectional view showing the relation of the various pretensioner parts after the pretensioner has been activated.

Reference is briefly made to FIG. 8 which shows the pretensioner 100 in an active state with the CLR 130 driving the gear 104. As can be seen the force exerted by the tooth of the CLR 130 in contact with the gear tooth 104 generates a generally horizontal force $F_G$. A similarly directed force $F_B$ is shared by bearings 55a,b urging them against the frame. This bearing force is counteracted by an oppositely direct force $F_B$ generated as the occupant loads the seat belt 31.

Returning to FIG. 2 the other end 116 of the tube is flared to a larger diameter and receives a detonator, squib, or initiator 120 of known type. The detonator, initiator or squib 120 produces products of combustion within an adjacent pressure chamber 122 upon receipt of an electric control signal generated by an electronic control unit 124 and communicated to the squib via wires 126. The control or activation signal is generated upon sensing that the vehicle is involved in an accident of sufficient magnitude to warrant pretensioner activation. As can be seen the tube 108 is curved to fit within the side profile of the retractor frame. The tube includes a first curved portion 117a, a second curved portion 117b and a third curved portion 117c. This third curved portion transitions into the flat end 110. The curvature of the first curved portion 117a is held at a fixed radius. Extending inwardly from the tube 108 is a flat, curved member 118, having the same curvature as section 117a. The end 118a of this member 118 is oriented at an acute angle B, relative to the tube 108. The curved member 118, as described below, functions in cooperation with the pretensioner housing 200 as a chain catching cavity, passage or chamber.

The tube 108 is placed within a molded plastic housing 200 having a trap plate 202, a center housing section 204 and a spring cap 246. The trap plate and center housing section each includes a plurality of screw holes 206 aligned with similar holes in the frame side 23b. The tube housing 200 is secured to the frame 52 by a plurality of fasteners (not shown) received within the holes 206. The center housing section 202 includes a rear plate 210 and a circumferential outer wall 212 that extends about most of the rear plate 210. Extending from the rear wall is a first interior wall or boss 214 having arcuate sides 214a,b,c. Side 214a is spaced from the outer wall 212 and defines a space 216a to cradle part of the tube. Side 214b is generally circular and spaced about the gear 102. The curved side 214c supports part of the flat, curved catching member 118 (also see FIG. 2). The member 118 is also supported by a curved side 220a of another walled portion or boss 220. The housing section 204 additionally has an oblong shaped, walled portion or boss 230. With the trap plate and center housing section 204 mated together, these housing sections, member 118 and boss 230 define a curved passage 234 (see FIG. 8) into which the CLR 130 is wound and retained after pretensioner activation.

The center housing section 204 includes an opening 241 therein to receive the spring arbor end 56b of the shaft 56. Integrally formed on the plate 210 is a spring housing 242 having a walled portion 244, which extends outwardly from the plate 210. The spring housing also includes a cover 246 that seats on the wall 244 and is secured thereto in a known manner. The trap plate includes a center opening 240 and a curved pocket 243 (see FIG. 1) which receives and supports a side of the tube 108.

The CLR 130 is a chain-like, flexible, toothed, force transfer member or a driving mechanism situated within the tube 108. The CLR functions as a chain as well as a rack (such as a flat rack used in a rack and pinion gear set). The CLR 130 includes a plurality of adjacent, joined links 134b and 134c. The first link is also generally designated as 134a and the last link is designated as 134n connected to a piston 142. To reduce or eliminate any noise due to the rattling of the CLR 130 within the tube 108, as well as lubricating the tube and gear 102, the tube can be filled, from for example the piston 142 to the first link 134a, with a temperature stable grease or paraffin, both generally referred to as 143, that remains in a non-crystalline state at low temperatures such as −40° C. and in a non-fluid state at a high temperatures of about 100° C.

Figure 7:
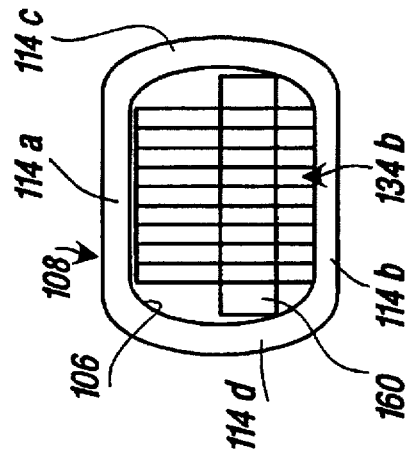
FIG. 7 is a cross-sectional view showing a plurality of link plates with a pretensioner tube.
Figure 5:
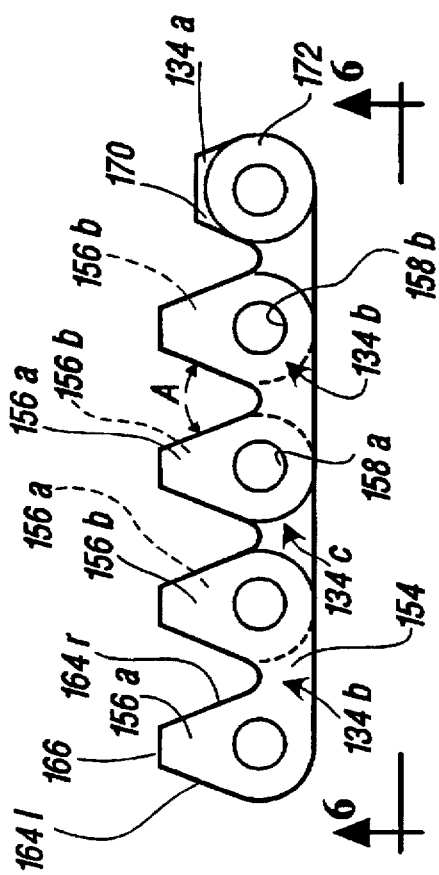
FIGS. 5 and 6 show various views of links of a chain link rack.
Figure 6:
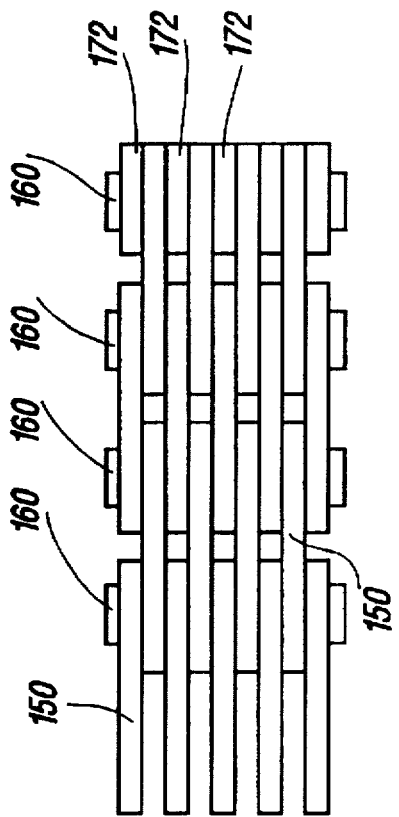

Reference is made to FIGS. 5–7 which illustrate the links in greater detail. With the exception of the first link 134a, each link comprises a plurality of identical plates 150. Those links designated as 134b comprise five (5) spaced plates while those links designated as 134c comprise four (4) spaced plates that fit within the spaces 152 between the plates 150 of links 134b. Each plate includes a body 154, two extending projections or teeth 156a,b and two pin holes 158a,b for receipt of a link pin 160. Each tooth includes a right hand surface 164r and a left hand surface 164L. In the embodiment shown the angle A, between adjacent tooth surfaces 164r and 164L, is approximately 40 degrees. The tooth ends or tops are designated as 166. As can also be seen the plates of the adjacent links 134b and 134c extend across each corresponding link pin 160. In this way the driving or reaction force with or against each tooth 104 is shared across the entire length of the pin at the intersection of two adjacent plates 150. FIG. 7 is a cross sectional view showing an exemplary link 134b and pin 160 located within the tube 108.

Figure 2:
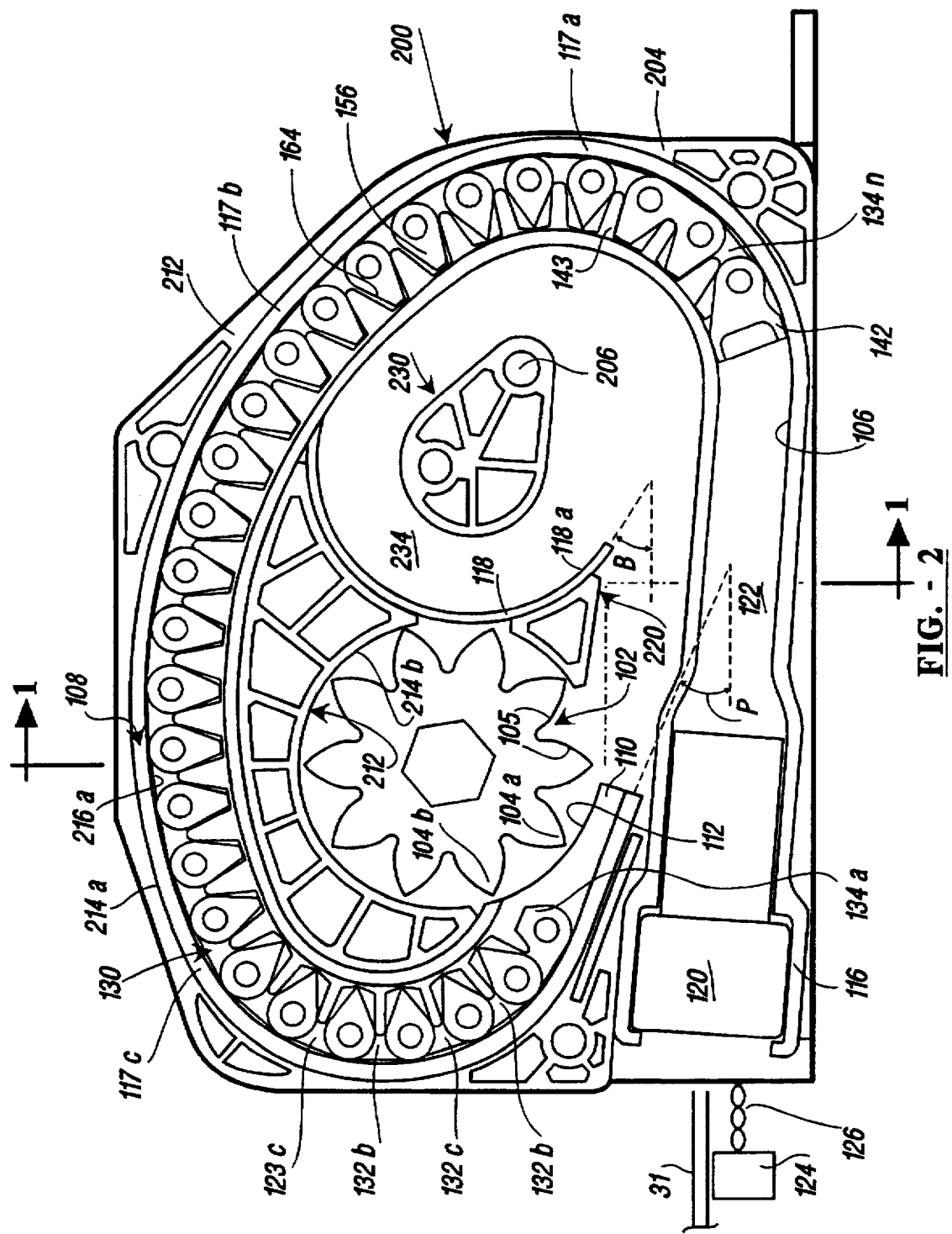
FIG. 2 is a cross-sectional view through section lines 2—2 of FIG. 1.
Figure 3:
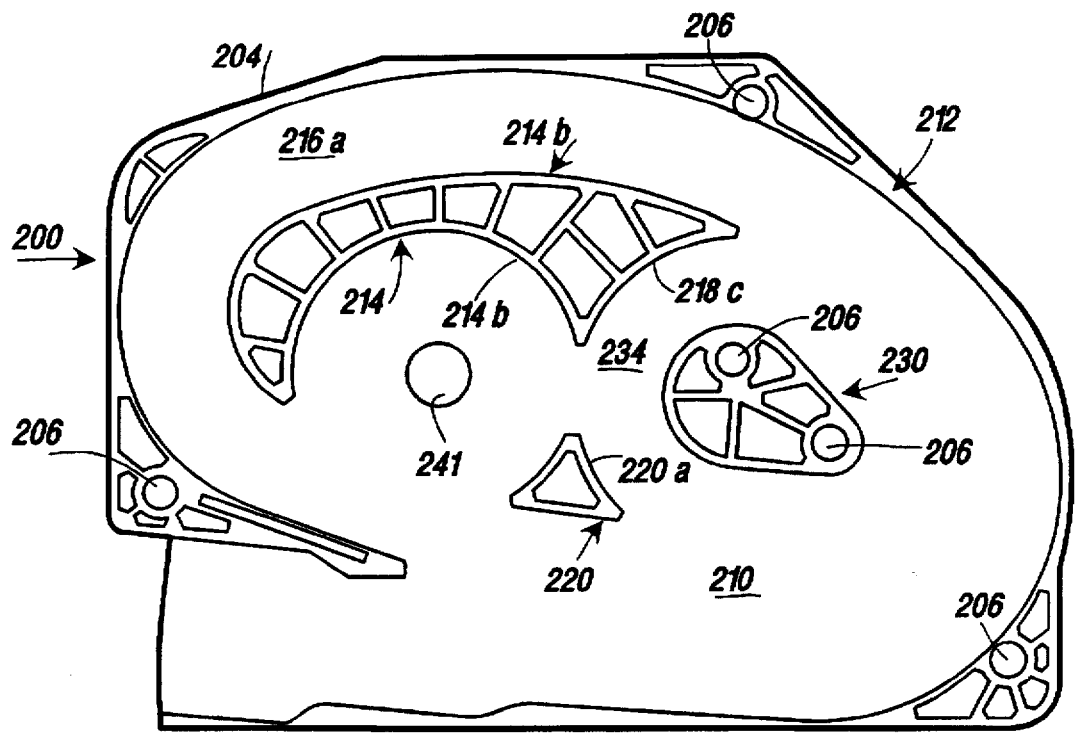
FIG. 3 is an isolated view of a center tube housing section.
Figure 4:
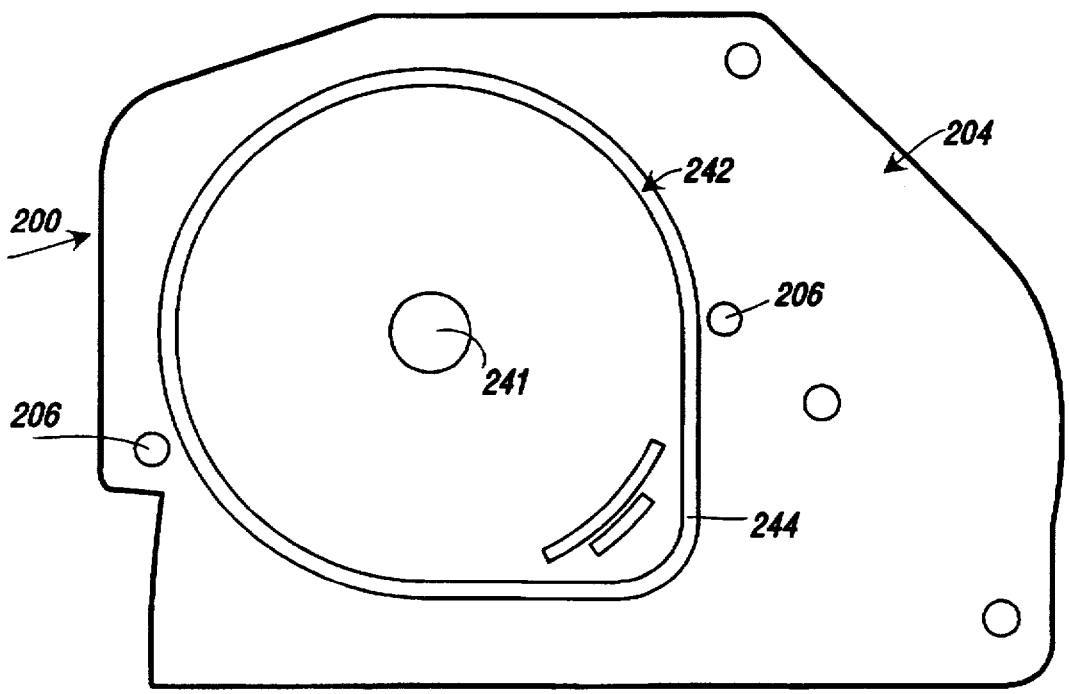
FIG. 4 is a side plan view of a front tube housing section.

As can be seen from FIG. 2 the first link 134a of the CLR 130 is initially maintained apart from the drive gear 102 so as not to impede the gear (which rotates with the spool) normal during retraction and protraction of the spool. The last link 134n is attached to a piston 140. This piston provides a front side and the squib 120 provides the rear side of the chamber 122. The piston 140 includes a flexible, flared annular end 142 (see FIG. 2) comprising a gas seal.

Each of the plates 150 defining the forward set of teeth 170 of link 134a is truncated and the plates spaced by washers 172. The purpose of this reduced sized tooth is to assist in achieving the synchronous engagement of the teeth of each plate 150 with the teeth 104 of the gear 102 and also to prevent a tooth-to-tooth jammed condition. If the first tooth of the first link 134a were full sized there could be a possibility that it might jam against a gear tooth 104 (depending upon the orientation of the gear 102). By providing the first set plates with the above profile the first teeth set of link 134a will pass under a closely spaced gear tooth 104b that is in an angular position that would otherwise induce jamming and engage the adjacent tooth, for example tooth 104a, or just push it out of the way. The synchronized engagement of the other teeth of each plate 150 with gear 102 is now assured.

The operation of the system comprising the retractor 20 and pretensioner 100 is as follows. Upon sensing an emergency condition the initiator 120 is activated to produce products of combustion which bear against a facing wall of the piston 140. The seal 142 of the piston prevents the products of combustion from escaping from the chamber 122. Thereafter the piston 140 is propelled down the tube 108 and in so doing pushes the CLR 130 down the passage 106. Each link of the CLR is guided by the tube guide walls 114a–d. As each link 134a–134n moves past a driven gear 102, the gear teeth 104 are engaged by a corresponding leading face 164r of the teeth 156a,b of the plurality of plates 150. As the driven gear 102 is driven by the link teeth of the CLR 130, the spool 24 is reverse rotated to retract a determinable amount of webbing back onto the spool drawing the seat belt 31 tight about the occupant. Under the operation of the pretensioner 100 and assuming a full CLR 130 stroke, the spool 24 will reverse rotate about 2.0 to 2.5 revolutions.

As the CLR 130 advances through the passage 106 its first link is pushed through the open, flat end 110. As previously mentioned, in the vicinity of the gear 102 the tube is flat to insure that at least two (2) gear teeth 104 are in engagement with CLR tooth 138 at any given time and angled, up from the horizontal, by one-half the angle A, between adjacent gear teeth. As the piston 140 continues to move through the tube 108 the CLR 130 is pushed a greater distance out of the tube to engage the member 118, engages another part of the CLR 130 that is sliding on the exterior wall 146 of the tube 108 and rolls up with the space 234 as shown in FIG. 8. The angled orientation of the member 118 causes the first link 134a to engage one of the moving links with a forward component of momentum.

During the operation of the pretensioner the vehicle sensor 302 or web sensor 300 has similarly been activated by the accident moving the locking pawl 77 into locking engagement with the teeth of the locking wheel 71. During pretensioner operation the spool and locking wheel are reverse wound and the locking pawl ratchets over the typically curved lock wheel teeth 73. After belt slack has been eliminated under the action of the pretensioner 100 and when the belt is later loaded by the occupant, the belt 31 is prevented from protracting by the locking engagement of the pawl 77 with the teeth 73 of the lock wheel 71.

Many changes and modifications in the above described embodiment of the invention can, of course, be carried out without departing from the scope thereof. Accordingly, that scope is intended to be limited only by the scope of the appended claims.

We claim:

1. An apparatus (20, 100) comprising:
   retractor having a frame and a spool rotationally supported on the frame to store seat belt webbing:
   driven means (102) operatively linked to the spool of the retractor (20) to rotate the spool (24) in a direction of retraction to cause a seat belt (31) wound thereabout to retract to eliminate belt slack about an occupant;
   an arcuate passage (108), generally laying within the profile of the frame, having a flat exit end (110) proximate the driven means;
   flexible drive means (130), movable within the passage, having a front end (134a) initially maintained out of engagement with the driven means and pushed into engagement with the driven means to cause same to rotate;
   first means (120) for pushing the drive means into engagement with the driven means thereby causing the driven means to rotate; and
   catch means, located within the profile of the frame, for retaining a portion of the drive means after it has exited the exit end of the passage.

2. The apparatus as defined in claim 1 wherein the drive means comprises a length of joined links (134) and wherein the driven means (102) comprises a gear wheel having a plurality of gear teeth (104) which are engaged by and driven by teeth (156) formed on the chain links.

3. The apparatus as defined in claim 2 wherein the passage circumscribes the drive means.

4. The apparatus as defined in claim 2 wherein the passage includes at least two opposing generally flat sides (164).

5. The apparatus as defined in claim 1 further including a return spring (57) for retracting the seat belt;
   at least one sensor (300, 302) for initiating the locking-up of the spool.

6. The apparatus as defined in claim 1 wherein the first means comprises a pyrotechnic device (120) which generates products of combustion to propel a piston (142), adjacent one end of the flexible drive means, down the passage thereby pushing the drive means down the passage.

7. The apparatus as defined in claim 2 wherein the plurality of links are formed as a plurality of sets of links each formed by a plurality of plates (150) wherein a first set of links interleaves with plates of a second set of links.

8. The apparatus as defined in claim 1 wherein an engagement angle at which the drive means engages the driven means with respect to a pull-off direction of the seat belt relative to the retractor is equal to the pressure angle of teeth on both the drive and driven means in order to minimize bearing load during operation of the pretensioner.

9. The apparatus as defined in claim 8 wherein the load angle deviates from nominal by +/−10°.

10. The apparatus as defined in claim 2 wherein a first tooth (134N) of the drive means is reduced in size to avoid a tooth-to-tooth jammed condition between the Sear teeth and the teeth of the drive means.

11. The apparatus as defined in claim 2 wherein the exit end of the passage is sufficiently flat to present the teeth of the flexible drive means in a flat orientation prior to engagement with the gear teeth.

12. The apparatus as defined in claim 1 including sound reduction means for reducing noise due to vibration while the drive means is stationary within the passage.

13. The apparatus as defined in claim 12 wherein the sound reduction means includes lubricating means for lubricating the drive means within the passage.

14. The apparatus as defined in claim 1 including an exterior cover enclosing the catch means to prevent the driven means from leaving the catch means.

15. The apparatus as defined in claim 1 wherein the catch means includes a first wall element which is formed by an exterior of the wall of the arcuate passage.

16. The apparatus as defined in claim 15 wherein the arcuate passage includes a first curved section and wherein the catch means includes an arcuately shaped second wall element extending from the exterior of the wall of the arcuate passage, and oppositely disposed relative to the first curved section and having a curvature generally equal to that of the first curved section.

17. The apparatus as defined in claim 1 wherein the catch means includes an annular cavity for receiving and retaining the rack and a center member defining an inner guide surface for the rack.

18. The apparatus as defined in claim 1 wherein the catch means is located adjacent the driven means and wherein the catch means and the driven means are interior to the arcuate passage.

19. A flexible chain link rack (130) for driving a toothed gear (102) of a retractor pretensioner (100) comprising:

a plurality of first links (134b) and a plurality of interleaved second links (134c)

each first and second link comprising: a plurality of spaced plates (150), each plate of each first and second link being identical and including a body (154) having pin receiving openings (158a,b) to receive a link pin (160) and two teeth (156) extending therefrom, the teeth each having angled side walls (164), wherein each of the second links (134c) comprising one less plate than the first links so that the plates of the second links fit in spaces between the plates of the first links;

when laid flat the teeth of the plates of adjacent first and second links being in line with one another such that the teeth of each such plate can simultaneously engage a tooth of the gear (102).

20. The apparatus as defined in claim 19 wherein the angled side walls are flat.

21. The apparatus as defined in claim 20 wherein the each tooth includes and interior and exterior wall and wherein when the chain link rack is laid flat the angles of each interior and exterior wall are respectively equal and opposite.

* * * * *